Patented Dec. 12, 1922.

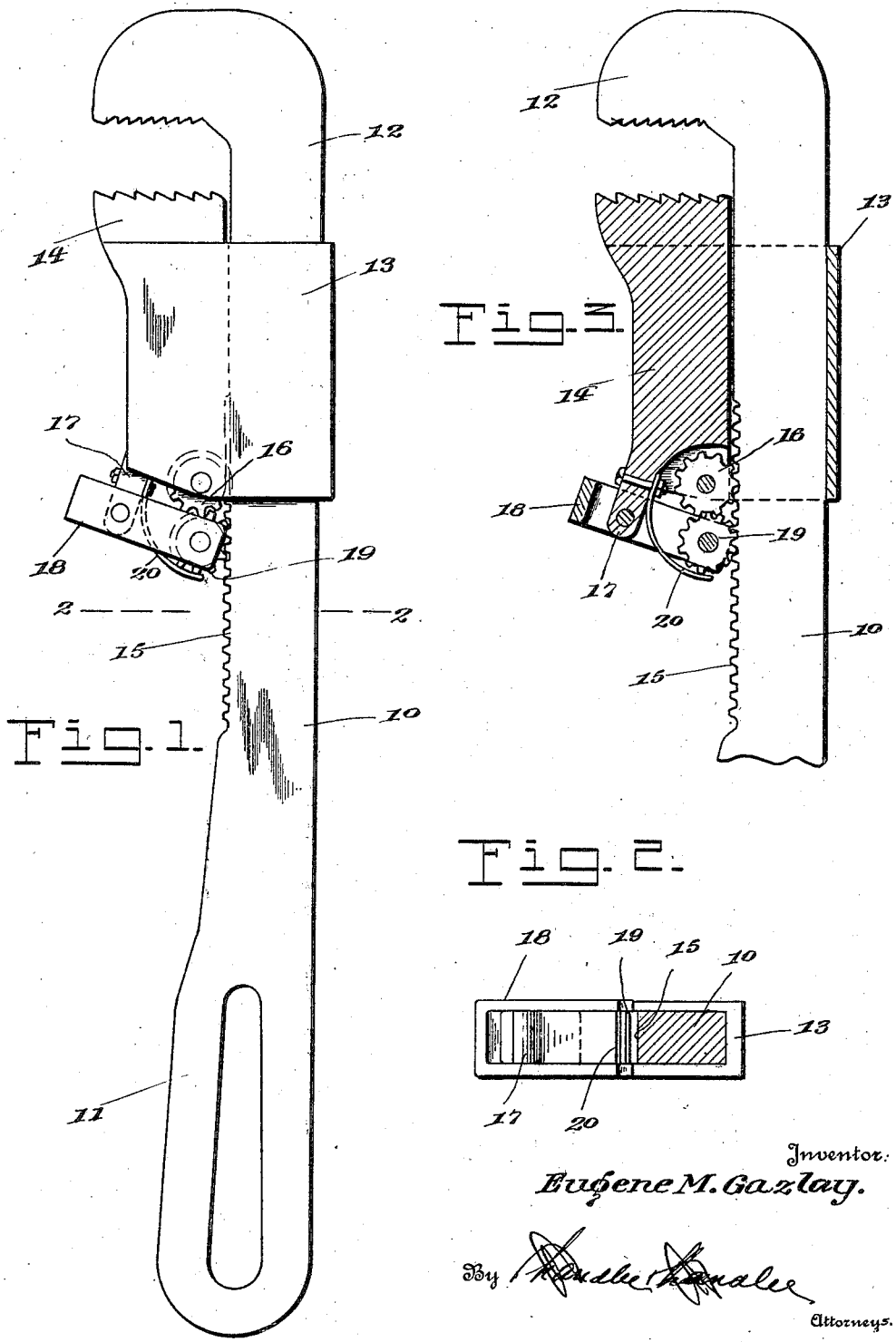

1,438,641

UNITED STATES PATENT OFFICE.

EUGENE M. GAZLAY, OF SIDNAW, MICHIGAN.

WRENCH.

Application filed February 5, 1921, Serial No. 442,744. Renewed May 25, 1922. Serial No. 563,673.

*To all whom it may concern:*

Be it known that I, EUGENE M. GAZLAY, a citizen of the United States, residing at Sidnaw, in the county of Houghton, State of Michigan, have invented certain new and useful Improvements in Wrenches; and I do hereby declare the following to be a full, clear, and exact description of the invention, such as will enable others skilled in the art to which it appertains to make and use the same.

This invention relates to new and useful improvements in wrenches and particularly to sliding jaw wrenches.
One object of the invention is to provide a wrench wherein the sliding jaw is capable of quick and easy movement into position to cooperate with the stationary jaw, but which requires the manipulation of a detent to permit movement of the jaw out of gripping position.

Another object is to provide an improved form of supporting means for the jaw locking means.
Other objects and advantages will be apparent from the following description when taken in connection with the accompanying drawing.

In the drawing:
Figure 1 is a side elevation of a wrench made in accordance with the invention.

Figure 2 is a transverse sectional view taken on the line 2—2 of Figure 1, through the shank rearwardly of the pivoted detent.
Figure 3 is a vertical longitudinal central sectional view taken on the line 3—3 of Figure 2.

Referring particularly to the accompanying drawing, 10 represents a shank having the hand grip 11 on one end and the rigid or stationary jaw 12 on its other end. Slidably disposed on the shank, in embracing relation thereto, is a casing or sleeve 13, on which is carried the movable jaw 14. On one edge face of the shank are formed the longitudinal series of transverse teeth 15, with which meshes the teeth of a gear 16, rotatably supported within the end of the sleeve 13. This gear is so mounted in the sleeve as to remain in constant mesh with the teeth of the shank, at all times. Projecting from the outer portion of the inner or rear end of the sleeve 13 is a lug 17, and straddling this lug, and pivotally supported thereon, is a yoke 18. Rotatably supported by, and disposed between the outer ends of the legs or arms of the yoke 18, is a gear 19 which also meshes with the teeth of the shank. A bowed spring 20 is secured to the inner face of the lug 17, and extends rearwardly and toward the adjacent edge face of the shank, around the gear 19. The tendency of this spring is to swing the yoke so that the gear 19 meshes with the teeth of the shank, and with the teeth of the other gear 16, at the same time. By reason of the fact that, when the attempt is made to move the sleeve in a direction away from the rigid jaw 12, the spring 20 holds the gear 19 in mesh with the rack of the shank and with the gear 16, thus preventing rotation of either gear. Also, by reason of the fact that, when the gears 16 and 19 are in mesh, they must rotate in opposite directions, if one or the other remains in mesh with the rack of the shank, this is prevented by the fact that the other gear is in mesh with the rack and its tendency is to rotate in the same direction with the first gear. To permit movement of the sleeve toward the jaw 12, it is necessary to grasp the bight portion of the yoke 18 and rock the yoke in a direction away from the adjacent end of the sleeve 13, with the result that the gear 19 will be swung out of mesh with the gear 16. Both gears will then rotate freely in their engagement with the teeth of the shank. Release of the yoke, will permit the spring to restore the engagement of the gears 16 and 19, and the locking of the sleeve against any further movement in a direction away from jaw 12.

The sleeve may be readily and easily moved toward the jaw 12, by a slight pressure, this movement resulting in the dragging of the gear 19 on the teeth of the shank, and the rocking of the yoke against the force of the spring, to move the gear 19 out of mesh with the gear 16. Thus, to move the sliding jaw toward the stationary jaw to grip the work, very little pressure is necessary.

It will be noted that both gears 16 and 19 remain in mesh with the teeth of the shank, whether they engage with each other or not.

The other end portion of the spring 20 extends longitudinally through the sleeve 13 and bears on the toothed edge face of the shank to urge the sleeve firmly into frictional engagement with the other edge face of the shank.

What is claimed is:

A wrench including a toothed shank, a sliding sleeve mounted on the shank, a gear mounted within the sleeve and in constant mesh with the teeth of the shank, a lug extending from the sleeve, a U-shaped yoke having its legs straddling the lug and pivoted thereto, a second gear rotatably mounted between the free ends of the legs of the yoke, and a spring secured to the lug and bearing against the second-named gear to yieldably hold the same in mesh with the first-named gear and the teeth of the shank.

In testimony whereof, I affix my signature, in the presence of two witnesses.

EUGENE M. GAZLAY.

Witnesses:
H. A. LINQUIST,
H. L. KIRTLAND.